United States Patent [19]

Howe, Jr.

[11] 3,938,901

[45] Feb. 17, 1976

[54] LOCKING DEVICE FOR A BEARING RING OR THE LIKE

[75] Inventor: Ralph S. Howe, Jr., New Britain, Conn.

[73] Assignee: Textron, Inc., Providence, R.I.

[22] Filed: Oct. 1, 1974

[21] Appl. No.: 511,085

[52] U.S. Cl. .................................. 403/350; 308/236
[51] Int. Cl.² ............................................ F16C 35/06
[58] Field of Search ............ 403/350, 351; 308/236

[56] References Cited
UNITED STATES PATENTS

| | | | |
|---|---|---|---|
| 1,561,443 | 11/1925 | Searles | 308/236 |
| 1,821,877 | 9/1931 | Bowne | 308/236 |

Primary Examiner—Andrew V. Kundrat
Attorney, Agent, or Firm—Hopgood, Calimafde, Kalil, Blaustein & Lieberman

[57] ABSTRACT

The invention contemplates selectively securing a bearing ring or the like to a cylindrical shaft, using a collar rotatably carried on a slotted end of the bearing ring. The collar bore and the collar-overlapped part of the slotted end have substantially conforming contours; in the case of the ring contour, a minimum radial extent characterizes the angular region of any slot, and a maximum radial extent characterizes an angularly offset location which, for the case of a two-slot ring, involves maximum radial extent angularly intermediate the slots. Various forms are described.

20 Claims, 5 Drawing Figures

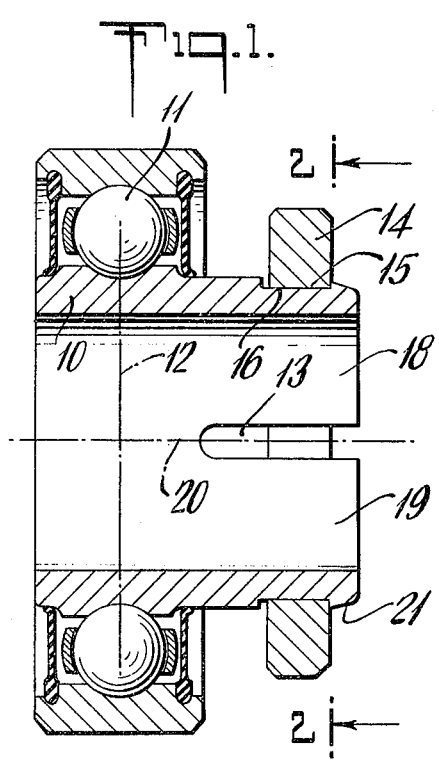
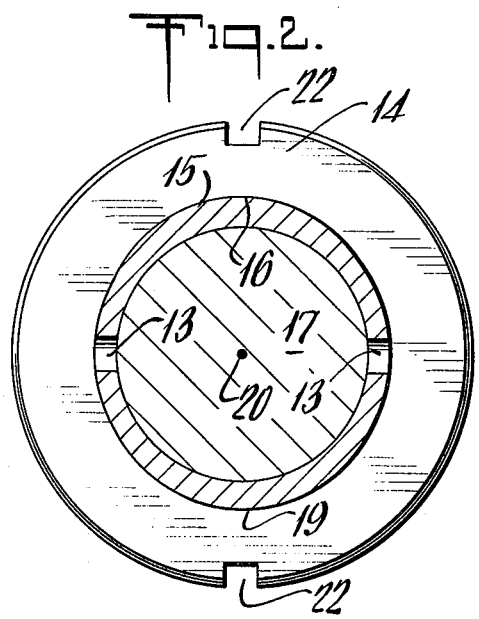
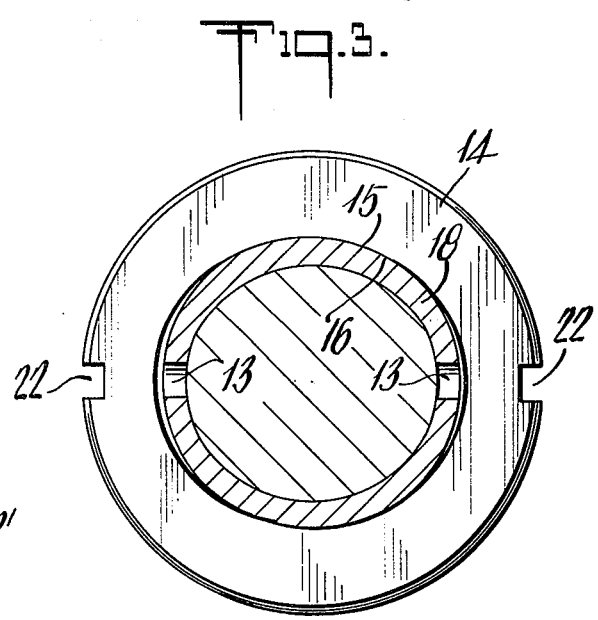
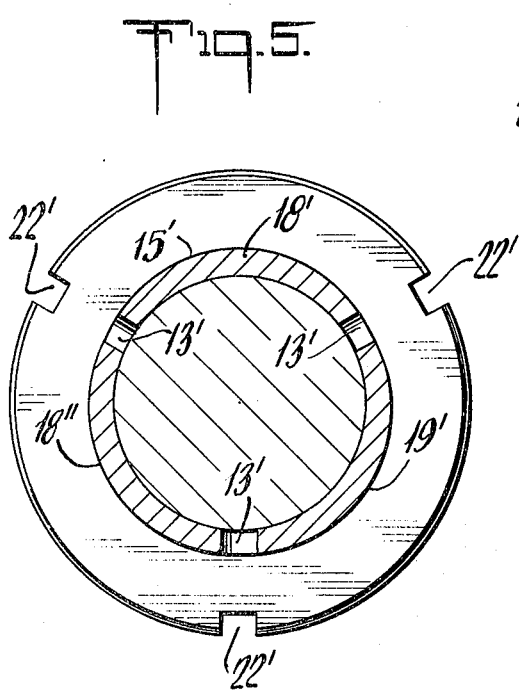
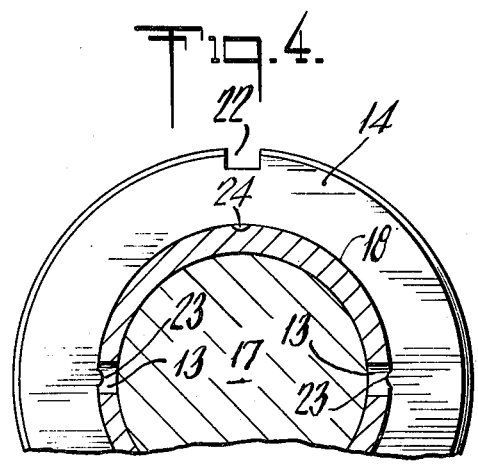

LOCKING DEVICE FOR A BEARING RING OR THE LIKE

This invention relates to means for selectively clamping a ring element, such as an inner ring of an antifriction bearing, to a cylindrical shaft.

It has been customary to employ a so-called eccentric locking collar as a means of clamping a bearing ring or the like to a cylindrical shaft. Such a collar relies upon coacting eccentric surfaces on an end of the ring and on the collar, for developing a jammed condition wherein the collar binds to the shaft at one angular location and locally jams the ring to the shaft at a diametrically opposite location, thus setting a clamp-force alignment which can never be purely radial. Usually, a set screw is relied upon to hold the collar to the shaft so that locking action can improve with rotation under load. This may work well as long as rotation continues in the same direction. But in a reversibly driven situation, the locking action frequently reverses its jam direction, thus at least momentarily unlocking the engagement, it often occurs that the lock is altogether lost or the set screw is caused to damage the shaft. Moreover, such locking collars necessarily involve axial length beyond the adjacent end of the ring, in order to establish the collar bind to the shaft.

It is an object of the present invention to provide an improved locking device, avoiding noted disadvantages of prior devices.

Another object is to provide a ring-locking device characterized by development of purely radial locking action.

It is also an object to provide a ring-locking device involving shaft engagement only by the ring, i.e., involving no locking-collar, set-screw or other added contact with the shaft.

A further object is to meet the above objects with a construction wherein the locking collar is or may be in self-retained unit-handling relation on the ring, and wherein the assembled locking collar requires no axial accommodation beyond the axial end of the ring.

A still further object is to provide an improved ring-locking mechanism wherein simple visual inspection alone can reveal the locked or unlocked condition thereof.

A specific object is to provide a ring-locking device without use of set-screw means and providing the capability of permanently locked shaft-mounting of a ring, such as the inner ring of an antifriction bearing, regardless of the number of rotation reversals under load.

It is a general object to achieve the above objects with basically simple, easily installable, low-cost structure, which is capable of achieving equally effective locking for either or both directions of rotation.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a longitudinal sectional view through an anti-friction bearing equipped with shaft-locking means of the invention;

FIGS. 2 and 3 are sectional views taken at 2—2 of FIG. 1, with the parts on a shaft, to respectively show unlocked and locked relations of the parts;

FIG. 4 is a fragmentary view similar to FIG. 2, to show an additional feature; and FIG. 5 is a view similar to FIG. 2 to show a modification.

In FIG. 1, the invention is shown in application to the inner ring 10 of an antifriction bearing having plural balls 11 riding spaced raceways in a load-sustaining region at the left end of ring 10 and centered at the radial plane 12. The other end of ring 10 has one or more axially extending radial slots 13, to enable ring constriction when clamping to a shaft. A circumferentially continuous locking collar 14 axially overlaps part of the slotted region and is retained by shoulders or side walls of a peripheral groove 15 in said part of the slotted region. The collar bore 16 and the bottom of groove 15 have conforming profiles which are relied upon to establish the lock action of the invention.

In FIG. 2, the number of slots 13 in ring 10 is seen to be two, at diametrically opposite locations, and the parts are shown on a cylindrical shaft 17, in unclamped condition. The two slots 13 render deformable two fingers 18–19 of the "split tail" of ring 10. According to a feature of the invention, the peripheral contour of the bottom of groove 15 is characterized by a minimum radial extent $R_{min.}$ (about the ring axis 20) at each slotted region, and it is further characterized by maximum radial extent $R_{max.}$ at each of the regions angularly intermediate the slotted regions. Preferably, the peripheral contour of groove 15 is smoothly continuous and is thus elliptical in nature, wherein the minor-axis alignment is with slots 13 and wherein the major-axis alignment is half-way between, i.e., 90° offset from alignment of slots 13. Generally speaking, for hardened steel parts, the major-axis or maximum radial extent should exceed the minor-axis or minimum radial extent by about 1.0 to 2.5 percent, a 1.5 percent figure being found satisfactory for the case of a bearing having an inner-ring bore of ½ inch diameter, and a 0.020 inch interference between the major-axis extent of surface 15 and the minor-axis extent of surface 16 being typical for the case of an inner-ring bore to fit a 1 inch diameter shaft 17.

To facilitate assembly of the parts, one or both have cam formations, such as the chamfer or bevel 21 on ring 10. In such assembly, the chamfer 21 engages in the collar bore 16 and transiently inwardly deforms fingers 18–19 until collar 14 clears the axial-end shoulder of groove 15, whereupon fingers 18–19 snap outward to the collar-retaining position shown. Preferably, such assembly is made prior to shipment of the bearing, as there is never any need to remove collar 14. Such assembly is also made with the parts in their conforming angular relation, as shown in FIG. 2, and for convenience in recognizing this condition, one or more external indicia, such as spanner notches 22 are provided in collar 14 for registry with the alignment of slots 13, when in locked condition; thus, for the unlocked condition of FIG. 2, the notches 22 are shown in 90° spaced relation to slots 13.

In use, the bearing with its preassembled locking collar set for alignment at 13—22 (as in FIG. 2) is slidably assembled to and positioned along shaft 17. To secure this as a mounting position, first and second suitable tools such as a first spanner to engage slots 13 and a second spanner to engage notches 22, are rotated 90° with respect to each other to establish an aligned or registering relation of slots 13 and 22, as in FIG. 3. In this new position, the parts are locked by reason of the minimum-radius portions of the collar bore 16 seating upon the maximum-radius portions of the groove bottom 15. In the process, the hoop of collar 14 is stressed to spread on the axis of slots 13 (and to neck-in on the axis of slots 22) while radially inwardly compressing both fingers 18–19 against diametrically opposite regions of the shaft, and with purely radially directed force.

FIG. 4 illustrates provision of a detent projection 23 in the collar bore and at 90° offset from the angular location of a notch 22. Detent 23 engages a suitable retaining indentation 24 in the groove bottom, to identify and retain the locked (FIG. 3) relationship, as will be understood.

The embodiment of FIG. 5 serves to illustrate that the number of slots in the "split tail" end of ring 10 need not be two. In FIG. 5, there are three slots 13' at equal angular spacing. At the same time, slot locations establish regions of minimum radial extent of the groove-bottom contour 15', and the locations of maximum radial extent of surface 15' are intermediate the slot locations, i.e., 60° angularly offset from the slot positions. Parts in FIG. 5 are given previous reference numbers, with primed notation, in view of similarity to FIGS. 1 to 3, and locking will be understood to be established upon 60° rotation, rather than the 90° described in connection with FIGS. 2 and 3.

The described structures will be seen to have achieved all stated objects, and it is well to summarize certain features:

1. The action of clamping is purely radial, with symmetrically distributed uniform squeezes of the inner ring (fingers) to the shaft, resulting in equally effective locking regardless of drive direction and regardless of the number of direction reversals.

2. Locking requires only two pieces — the inner ring and the collar; there are not set screws or clips.

3. Locking is established due to an interference relation which is retained at a predetermined angular position of the parts; there can thus be no problem of how much torque to apply for locking, as in the case of set screws.

4. The magnitude of locking force is not related to friction coefficient or to angles; for any given application, an increased locking force is available without external dimension changes, merely by designing increased cam interference in the coacting surfaces, i.e., by increasing the ratio $R_{max}:R_{min}$, at 15—16.

5. Locked or unlocked status is readily and visually identifiable by observing notch 22 vs. slot 13 location.

6. The device is simple to lock and unlock, all without scoring the shaft, and no amount of vibration can destroy or impair the force of the locking squeeze.

7. The collar 14 lends itself to cost saving by manufacture using pressed-metal blanking (cookie-cut) techniques.

8. The collar 14 is less than one-half the width of collars in prior eccentric locking devices for the same shaft size, and is less than half the width of conventional set-screw collars, all while achieving superior locking action.

9. As compared to prior-art eccentric-locking collars, the end-for-end face-profile symmetry of the collar 14 means simplification of automated assembly to finished bearings.

While the invention has been described for the preferred forms shown, it will be understood that modifications may be made without departure from the scope of the invention.

What is claimed is:

1. Locking means for securing a bearing ring or the like to a cylindrical shaft, said ring having a cylindrical bore to fit the shaft and said ring having at one axial end a slot of limited axial length, whereby said ring is circumferentially discontinuous in an axial region of the slot and is therefore locally radially deformable in said axial region, said ring having at said axial region a circumferential contour characterized by a minimum radial extent at the angular region of the slot and by a maximum radial extent at a second angular region offset from said first-mentioned angular region to an extent less than 180°, and a circumferentially continuous locking collar having a bore conforming substantially to the said ring contour, said collar having an externally accessible formation engageable for relative angular displacement of said collar and ring to bring the second angular region of said ring into adjacency with the first angular region of said collar.

2. Locking means according to claim 1, in which the axial slot is one of two diametrically opposed slots in said ring.

3. Locking means according to claim 1, in which said circumferential contour is further characterized by a recurrence of said minimum and maximum radial extents at third and fourth angular regions which are respectively 180° offset from said first and second angular regions.

4. Locking means according to claim 1, in which said ring contour and the collar bore have rotation-resisting formations engageable when said ring and collar have been rotated into the relationship in which the second angular region of said ring is adjacent the first angular region of said collar.

5. Locking means according to claim 1, in which said ring has a circumferential groove at said axial region of the slot, said circumferential contour characterizing the groove bottom, whereby a collar-retaining shoulder is defined between the groove and the adjacent end of the ring, and means including a cam formation coacting between said ring end and the collar bore for facilitating snap-action axial assembly and retention of said ring and collar.

6. Locking means according to claim 1, in which said slot is axially open at said one axial end of said ring.

7. Locking means according to claim 1, in which said slot is of greater axial extent than that axial part of the collar bore which has said ring-contour conformance.

8. Locking means according to claim 1, in which the axial slot is one of three equally angularly spaced slots in said ring, in which said circumferential contour is further characterized by recurrence of said minimum radial extent at third and fifth angular regions which respectively coincide with the two additional slot regions, and in which said circumferential contour is still further characterized by recurrence of said maximum radial extent at fourth and sixth angular regions such that the second fourth and sixth angular regions are respectively intermediate said slotted regions.

9. In combination, an inner ring for an antifriction bearing and a locking collar assembled to said ring for selective clamping of said ring to a shaft, said ring having a cylindrical bore to fit the shaft and said ring being externally characterized at one axial region by an antifriction-element raceway and being characterized at a second axial region by two diametrically opposed axially extending radial slots open to the adjacent axial end of said ring, thereby defining a "split-tail" region of said ring at an axial location offset from the region of said raceway, said ring having in at least a portion of said "split-tail" region a circumferential contour characterized by a minimum radial extent at each of the opposed angular regions of the slots and by a maximum radial extent at the opposed angular regions which are intermediate the slotted regions, said locking collar being circumferentially continuous and having a bore assembled and conforming substantially to the ring contour.

10. In combination, an inner ring for an antifriction bearing and a locking collar adapted for assembly to said ring for selective clamping of said ring to a shaft, said ring having a cylindrical bore to fit the shaft and said ring being externally characterized at one axial region by an antifriction-element raceway and being characterized at a second axial region by two diametrically opposed axially extending radial slots open to the adjacent axial end of said ring, thereby defining a "split-tail" region of said ring at an axial location offset from the region of said raceway, said ring having in at least a portion of said "split-tail" region a circumferential contour characterized by a minimum radial extent at each of the opposed angular regions of the slots and by a maximum radial extent at the opposed angular regions which are intermediate the slotted regions, said locking collar being circumferentially continuous and having a bore assembled and conforming substantially to that of the ring contour, and coacting formations on said ring and collar for their snap-acting assembly and unit-handling retention.

11. The combination of claim 10, in which said ring has a circumferential groove in the second axial region, said circumferential contour characterizing the groove bottom, whereby a collar-retaining shoulder is defined between the groove bottom and the slotted end of the ring, said coacting formations including a bevel cam surface at the slotted end of the ring.

12. The combination of claim 10, in which said ring and collar include coacting rotation-resisting formations operative to retain an angular relation wherein the respective contours of the ring and collar bore have been rotated substantially 90 degrees from their angular location of conformance.

13. The combination of claim 10, in which said collar includes an externally visible angle-marking indicium at a predetermined location with respect to the contour variations of the collar bore, whereby the locked or unlocked nature of said combination can be readily ascertained by observing the angular position of said indicium with respect to one of the slots.

14. The combination of claim 13, in which said indicium is located to coincide with a slot location when said ring and collar-bore contours are in their locked angular relation.

15. The combination of claim 14, in which said indicium is one of two, there being one indicium for registry with each slot for their locked angular relation.

16. The combination of claim 15, in which each indicium is a tool-engageable formation.

17. Locking means according to claim 1, in which the axial slot is one of a plurality $n$ of equally angularly spaced slots in said ring, in which the circumferential contour is characterized by $n$ recurrences of said minimum radial extent at the respective slot regions, and in which said circumferential contour is characterized by $n$ recurrences of said maximum radial extent at regions respectively intermediate said slotted regions.

18. The combination of claim 10, in which said circumferential contour is substantially elliptical.

19. The combination of claim 18, in which the major axis exceeds the minor axis of said elliptical contour to an extent between approximately 10 and 20 percent.

20. The combination of claim 18, in which the major axis exceeds the minor axis of said elliptical contour to the extent of substantially 15 percent.

* * * * *